United States Patent
Tayebi et al.

(10) Patent No.: US 10,848,057 B2
(45) Date of Patent: Nov. 24, 2020

(54) SYNCHRONOUS SAMPLING DC LINK VOLTAGE CONTROL FOR MICROINVERTERS

(71) Applicant: University of Central Florida Research Foundation, Inc., Orlando, FL (US)

(72) Inventors: Seyed-Milad Tayebi, Orlando, FL (US); Issa Batarseh, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 162 days.

(21) Appl. No.: 16/105,661

(22) Filed: Aug. 20, 2018

(65) Prior Publication Data

US 2019/0058395 A1    Feb. 21, 2019

Related U.S. Application Data

(60) Provisional application No. 62/548,228, filed on Aug. 21, 2017.

(51) Int. Cl.
*H02M 1/44* (2007.01)
*H02M 1/14* (2006.01)
(Continued)

(52) U.S. Cl.
CPC .............. *H02M 1/44* (2013.01); *H02M 1/14* (2013.01); *H02M 1/143* (2013.01); *H02M 7/44* (2013.01);
(Continued)

(58) Field of Classification Search
CPC .............. H02M 1/14–15; H02M 1/44; H02M 7/44–5395; H02J 3/38–50
See application file for complete search history.

(56) References Cited

U.S. PATENT DOCUMENTS 5,006,975 A * 4/1991 Neufeld .............. H02M 1/4225
                                                  323/222
8,934,269 B2   1/2015 Garrity
(Continued)

OTHER PUBLICATIONS

Lopez-Santos O., Cortes-Torres L., Tilaguy-Lezama S., Discrete Time Nested-Loop Controller for the Output Stage of a Photovoltaic Microinverter, Jan. 3, 2017, In: Applied Computer Sciences in Engineering. WEA 2016. Communications in Computer and Info (Year: 2017).*

(Continued)

*Primary Examiner* — Rexford N Barnie
*Assistant Examiner* — David A Shiao
(74) *Attorney, Agent, or Firm* — Fleit Intellectual Property Law; Thomas S. Grzesik

(57) ABSTRACT

A two-stage microinverter for coupling a PV panel to a power grid includes a DC/DC converter stage having an input for coupling to the PV panel and a DC/AC inverter stage that has an output for coupling to the grid, with at least one DC link capacitor between the DC/DC converter and DC/AC inverter stage. A synchronous controller that includes a loop compensator coupled to a mixer is between an analog-to-digital converter (ADC) and a phase-locked loop (PLL) for coupling to an output voltage from the grid. The ADC receives a DC link voltage from the DC link capacitor. An output of the PLL is for controlling a timing of sampling by the ADC of the DC link voltage so that the ADC samples the DC link voltage when an AC component of a ripple voltage on the DC link voltage intersects an average value of the DC link voltage.

16 Claims, 5 Drawing Sheets

PLL-SYNCHRONIZED DC LINK VOLTAGE CONTROL SYSTEM.

(51) Int. Cl.
*H02M 7/44* (2006.01)
*H02M 3/04* (2006.01)
*H02M 1/00* (2006.01)

(52) U.S. Cl.
CPC .......... *H02J 2300/24* (2020.01); *H02M 3/04* (2013.01); *H02M 2001/007* (2013.01)

(56) References Cited

U.S. PATENT DOCUMENTS

| | | | | |
|---|---|---|---|---|
| 9,065,354 | B2* | 6/2015 | Chapman | H02J 3/383 |
| 2005/0226017 | A1* | 10/2005 | Kotsopoulos | H02M 7/53873 |
| | | | | 363/125 |
| 2006/0245216 | A1* | 11/2006 | Wu | H02M 7/487 |
| | | | | 363/13 |
| 2014/0333141 | A1* | 11/2014 | Hu | H01L 31/00 |
| | | | | 307/84 |
| 2019/0058395 | A1* | 2/2019 | Tayebi | H02M 1/143 |

OTHER PUBLICATIONS

O. Lopez-Santos, G. Garcia, L. Martinez-Salamero and L. Cortes-Torres, "Suppressing the effect of the DC-link voltage ripple on the current control of a sliding-mode controlled microinverter," Oct. 28, 2015, 2015 CHILECON, Santiago, 2015, pp. 447-452. (Year: 2015).*

Faa Jeng Lin, et al., "Modeling and Controller Design of PV Micro Inverter without Using Electrolytic Capacitors and Input Current Sensors", Energies, 2016, 9, 993, pp. 1-17, www.mdpi.com/journal/energies.

* cited by examiner

PLL-SYNCHRONIZED DC LINK VOLTAGE CONTROL SYSTEM.

THREE-PHASE HALF-BRIDGE MICROINVERTER WITH A BIPOLAR DC LINK.

SYNCHRONOUS SAMPLING DC LINK VOLTAGE CONTROL FOR MICROINVERTERS

CROSS REFERENCE TO RELATED APPLICATIONS

This application claims the benefit of Provisional Application Ser. No. 62/548,228 entitled "SYNCHRONOUS SAMPLING DC LINK VOLTAGE CONTROL FOR MICROINVERTERS", filed on Aug. 21, 2017, which is herein incorporated by reference in its entirety.

FIELD

Disclosed embodiments relate to ripple control for two-stage microinverters.

BACKGROUND

A solar microinverter, or simply a microinverter, is a plug-and-play device used in photovoltaics that converts the direct current (DC) generated by a single solar module that comprises one or more solar panels into alternating current (AC). The output from several microinverters is generally combined and typically fed to an electrical power grid. Microinverters may be contrasted with conventional string and central solar inverters, which are connected to multiple solar modules or panels of the PV system.

FIG. 1 shows a typical DC link voltage control system 100 that includes a conventional two-stage microinverter 150 which connects a photovoltaic (PV) panel 110 to a power grid 140 that comprises a DC/DC converter stage 152 and a DC/AC inverter stage 158 along with a decoupling (DC link) capacitor 154 shown as $C_{DClink}$ in between these two stages. Typically, the DC/DC converter stage 152 provides a maximum power point tracking (MPPT) function for the PV panel 110 and boosts its relatively low DC voltage to a constant higher DC link voltage. The electrical energy generated by the PV panel 110 is stored by the DC link capacitor 154. The DC/AC inverter stage 158 converts the energy stored across this DC link capacitor 154 into an alternating current (AC) which is injected as 3-phase output current to the power grid 140 synchronized to the grid voltage. Therefore, the DC link capacitor 154 functions as an energy buffer to balance the instantaneous power difference between input power from the PV panel 110 and the output power. The pulsating output power causes a voltage ripple on the DC link capacitor 154.

This voltage ripple on the DC link capacitor 154 may adversely affect the microinverter's 150 power efficiency, the quality of power injected into the grid 140, as well as the MPPT efficiency. The total harmonic distortion (THD) of the microinverter's 150 output current provided to the grid 140 will increase as the DC link voltage ripple increases. This natural phenomenon cannot be mitigated by inverter control. The following expression below approximates the DC link instantaneous voltage for a single-phase full-bridge inverter:

$$v_{DC_{link}}(t) \approx V_{DC_{link},avg} + \frac{P_{in}}{2\omega V_{DC_{link},avg} \cdot C_{DC_{link}}} \sin(2\omega t) \quad (1)$$

where, $V_{DClink,avg}$ is the average DC link voltage, $P_{in}$ is the input power received from the PV panel 110, $\omega$ is the angular frequency, and $C_{DClink}$ is the capacitance of the DC link capacitor 154. Referring to equation (1), a higher capacitance for the DC link capacitor 154 shown as $C_{DClink}$ results in a smaller voltage ripple on the DC link voltage, and as $C_{DClink}$ decreases, the DC link voltage ripple increases.

Electrolytic capacitors with high capacitance are often used for the DC link capacitor 154 in order to mitigate this effect. Since electrolytic capacitors have a limited lifetime, they are not compatible with the microinverter systems lifetime which can be longer than 20 years. Therefore, in order to increase the microinverter system's lifetime, electrolytic capacitors can be replaced by lower capacitance film capacitors which have a dielectric plastic film as the dielectric, sometimes combined with paper as a carrier of the electrodes, such as polypropylene film capacitors, which are more tolerant of voltage ripple. Since film capacitors are more costly and physically larger than equivalent electrolytic capacitors, it is generally important to select the minimum possible capacitance value for the DC link capacitor 154 for a given application.

Since the DC link voltage normal operating range must be greater than the grid 140 voltage plus some operating headroom (margin), the DC link capacitor 154 rated voltage should be higher than this value with the addition of some voltage derating. Therefore, the DC link voltage should be maintained within this range by the microinverter's controller 160 in FIG. 1. This controller 160 regulates the DC link voltage with variations in input power, output voltage, and load current transients. A feedback loop senses the DC link voltage across the DC link capacitor 154, compares it with the desired reference voltage, and determines the inverter output current in order to regulate the DC link voltage. The inverter output current THD is also considered when designing the DC link voltage control system.

Specifically, the controller 160 samples the DC link voltage $V_{DClink,avg}$ after digital conversion by an analog-to-digital converter (ADC) 161, and with a comparator 166 compares it with a desired reference value shown as $V_{DClink-ref}$ to generate an error signal 167. The error signal 167 is a DC signal with a significant AC ripple as shown in FIG. 1. This error signal 167 is then used by a control loop compensator 162 to determine the inverter output peak current. The output of the loop compensator 162 has an AC component shown as Im(t) that is coupled to a mixer 163.

The controller 160 also includes a phase-locked loop (PLL) 164 that receives the grid voltage signal V(t) as its reference input and generates a sinusoidal output current waveform shown as sin(ωt) that is synchronized to the grid voltage. As known in electronics a PLL is an electronic circuit that has internal feedback with a voltage-driven oscillator and a phase comparator that constantly adjusts to match the frequency of an input signal. The control loop provided by the controller 160 regulates the DC link voltage by adjusting the inverter output peak current. When the input power from the PV panel 110 is greater than the average output power, the DC link voltage increases. Similarly, when the input PV power from the PV panel 110 is less than the average output power injected into the grid 140, the DC link voltage decreases. In an effort to balance the input PV power with the average output power, the control loop compensator 162 increases or decreases the microinverter output peak current by providing the current signal Im(t) shown as required.

In the two-stage microinverter, the presence of large voltage ripple on the DC link capacitor 154 introduces large ripples in the DC link voltage sense path to the controller 160 and consequently in the inverter output current if it is not filtered by the DC link voltage control loop. There exists two known approaches in order to mitigate this effect. One approach uses large capacitance values for the DC link capacitor 154 to attenuate DC link voltage ripple. This requires the use of electrolytic capacitors that suffer from limited lifetime and poor reliability, or high value film capacitors that are expensive and bulky which reduces power density and increases cost. An alternative approach uses analog or digital filters to attenuate harmonic distortion in the inverter output current caused by the DC link voltage ripple.

In the case of high peak-to-peak voltage ripple on the DC link, an analog filter requires a very high attenuation at low frequencies which results in lower loop bandwidth. Therefore, an analog low-pass filter placed in the DC link voltage sense path will exhibit poor transient response as well as adding cost to the design. Digital low-pass filters of varying complexity have also been disclosed in order to mitigate the harmonic content in the error signal. These filters provide some improvement but increase complexity and computation time, and are unable to eliminate all of the harmonic content.

The DC link voltage control system 100 generally samples the DC link voltage at a frequency of several kilohertz. Consequently, the voltage ripple on the DC link voltage is included in the sampling causing the error signal to have a harmonic content. If the harmonic content in the error signal is left unfiltered, it will cause harmonic distortion in the microinverter output current injected into the grid 140.

SUMMARY

This Summary is provided to introduce a brief selection of disclosed concepts in a simplified form that are further described below in the Detailed Description including the drawings provided. This Summary is not intended to limit the claimed subject matter's scope.

As described above, known two-stage microinverter circuits for their DC link capacitor typically use electrolytic capacitors that can have a short lifetime and poor reliability to try mitigate the effects of the otherwise large voltage ripple on the DC link voltage $V_{DClink,avg}$ across the DC link capacitor which can introduce large ripples in the DC link voltage sense path to the controller, and consequently in the microinverter output current. As noted above, such known two-stage microinverter circuits also require either a complex digital filter or an analog filter to attenuate harmonic distortion in the microinverter's output current which increases the circuit complexity and/or cost while exhibiting inferior performance to that of disclosed microinverters.

Disclosed embodiments solve these problems by providing a simple and accurate synchronous sampling method for two-stage microinverter circuits that senses the DC link average voltage across their DC link capacitor when the AC component of the ripple voltage intersects the DC link average voltage value, thus regardless of the presence of large voltage ripple, and with no need for the addition of analog or digital filters to filter the microinverter output current. The synchronous controller is thus able to tightly regulate the DC link average voltage even during transients while minimizing the inverter output current harmonic distortion. This makes it possible to select a minimum (lower) acceptable capacitance value for the DC link capacitor (see equation 1 above evidencing a small capacitance for the DC link capacitor 154 shown as $C_{DClink}$ is possible for a small voltage ripple on the DC link voltage), which reduces the design cost and improves the reliability and power density by avoiding the adverse impacts of the high DC link peak-to-peak voltage ripple. The capacitor utilized for disclosed microinverters can comprise a film capacitor or an electrolytic capacitor. Disclosed embodiments can generally be extended to any two-stage microinverter, and are particularly beneficial when there is a relatively high DC link voltage ripple (for example ≥40%).

Disclosed embodiments include a two-stage microinverter for coupling a PV panel to a power grid, including a DC/DC converter stage having an input for coupling to the PV panel and a DC/AC inverter stage that has an output for coupling to the power grid with at least one DC link capacitor in between the DC/DC converter stage and the DC/AC inverter stage. A synchronous controller that includes a loop compensator is coupled to a mixer between an ADC and a PLL that is for coupling to an output voltage from the grid. The ADC is coupled to receive a DC link voltage from the DC link capacitor. An output of the PLL is utilized for controlling a timing of sampling by the ADC of the DC link voltage so that the ADC samples the DC link voltage when an AC component of a ripple voltage on the DC link voltage intersects an average value of the DC link voltage.

DETAILED DESCRIPTION

Figure 1:
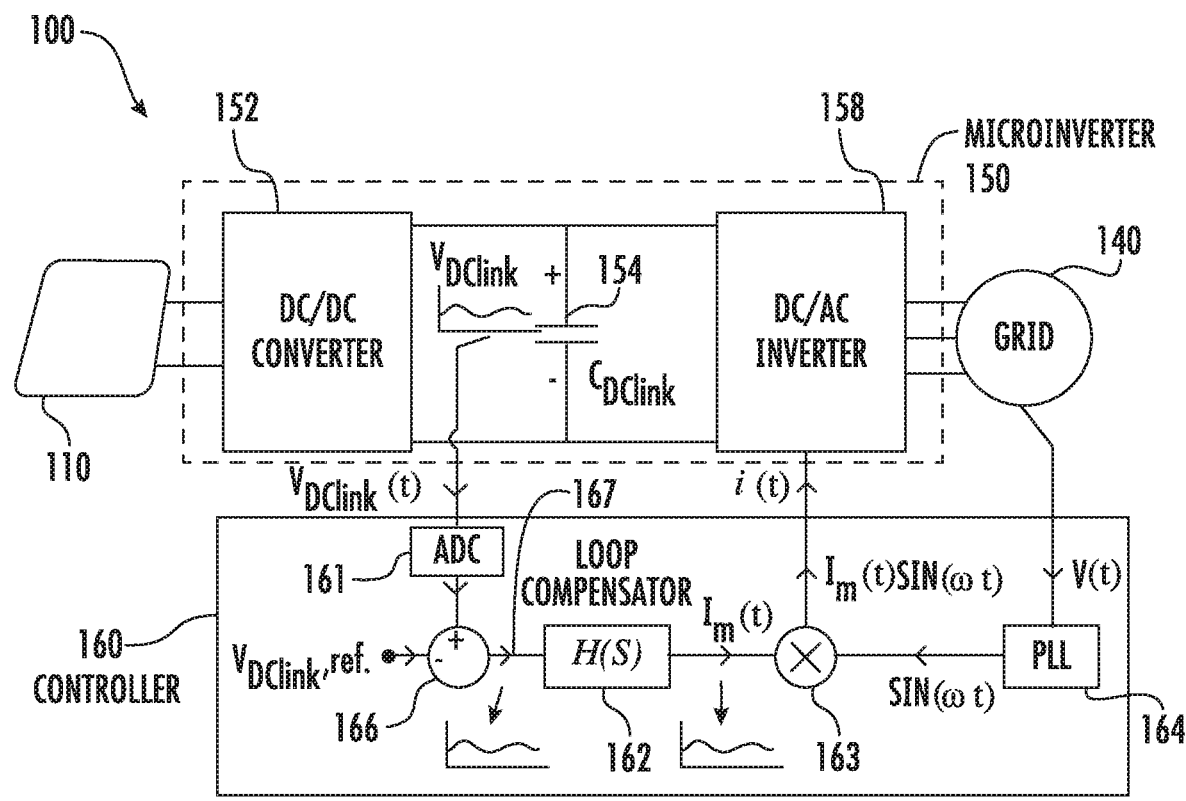
FIG. 1 shows a known DC link voltage control system including a two-stage microinverter and a controller.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Figure 2:
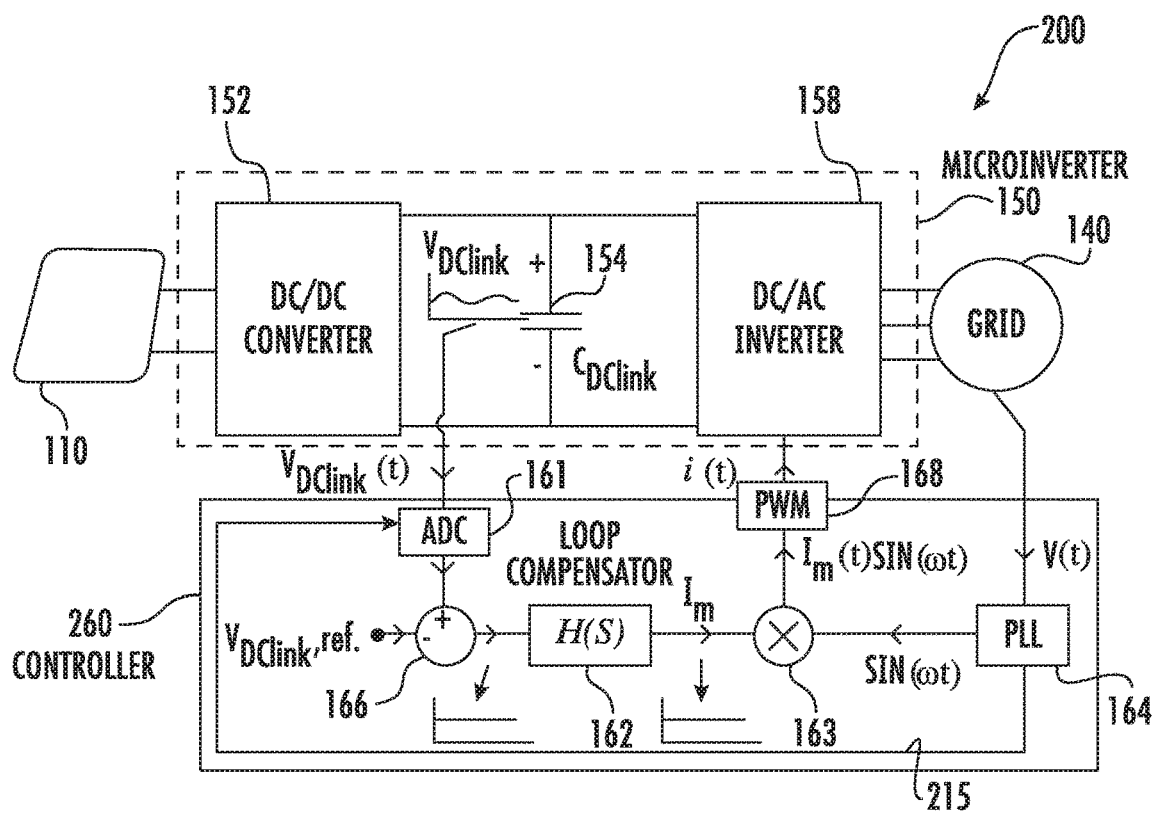
FIG. 2 shows an example PLL-synchronized DC link voltage control system, according to a disclosed embodiment.

FIG. 2 shows an example PLL-synchronized DC link voltage control system 200 that includes a disclosed synchronous controller 260 that resembles the controller 160 shown in FIG. 1, but adds a connection between an output of the PLL 164 and an input of the ADC 161 shown as connection 215. As with the DC link voltage control system 100 shown in FIG. 1 there is a DC link capacitor 154 between the DC/DC converter 152 and the DC/AC inverter 158 again shown providing a 3-phase output to the grid 140. The signal on the connection 215 is a digital trigger signal sent by the PLL 164 once in each line cycle to the ADC 161 to measure the DC link voltage at specific times.

Disclosed embodiments recognize if the DC link voltage across the DC link capacitor 154 is sampled by the ADC 161 at specific predetermined times, an accurate measurement of the DC link average voltage can be made with little or no harmonic distortion. Since it is recognized that the harmonics present in the DC link voltage are phase-locked by the PLL 164 to the grid voltage, this phase-locked relationship can be used to accurately predict when the AC component of the ripple voltage intersects the DC link average voltage value. Since most grid-tied microinverters include a PLL 164 to synchronize with the grid voltage, the can also be used as a clock signal to control the times that the ADC 161 samples the DC link voltage when an AC component of a ripple voltage on the DC link voltage intersects an average value of the DC link voltage by adding the connection 215 shown between the PLL 164 and a clock input of the ADC 161. Because the ADC 161 samples the DC link average voltage at these times, it will be sampling the DC link average voltage essentially without any of the distortion found in conventional DC link voltage regulators.

The PLL 164 can be an off-the-shelf PLL, or can be implemented in a microcontroller. Although the connection 215 is shown as a direct connection between the PLL 164 and the clock input of the ADC 161, there can be other connections used between the output of the PLL 164 and the clock input of the ADC 161 configured to control the ADC's 161 sampling so that the DC link average voltage across the DC link capacitor 154 is sensed when the AC component of the ripple voltage intersects the DC link average voltage value.

The DC link capacitor 154 can have a capacitance less than or equal to ($\leq$) 30 µF, such as $\leq$10 µF. Since disclosed controllers operate properly even with high voltage ripple on the DC link, such controllers enable the use of a low capacitance value for the DC link capacitor 154. This disclosed sampling method can use existing controller functional blocks and eliminates the need for additional analog and digital filters while minimizing the microinverter output current distortion. The error signal input from the output of the comparator 166 to the loop compensator 162 is now a DC value as shown in FIG. 2 (compare to the AC ripple shown in FIG. 1) which produces a peak current reference Im that is free of unwanted harmonics. This peak current reference is multiplied by the $\sin(\omega t)$ signal from the PLL 164 by mixer 163 which generates a pure sine wave input to a pulse-width modulation (PWM) block 168 that outputs the current signal shown as i(t) to an input of the DC/AC inverter 158.

Figure 3:
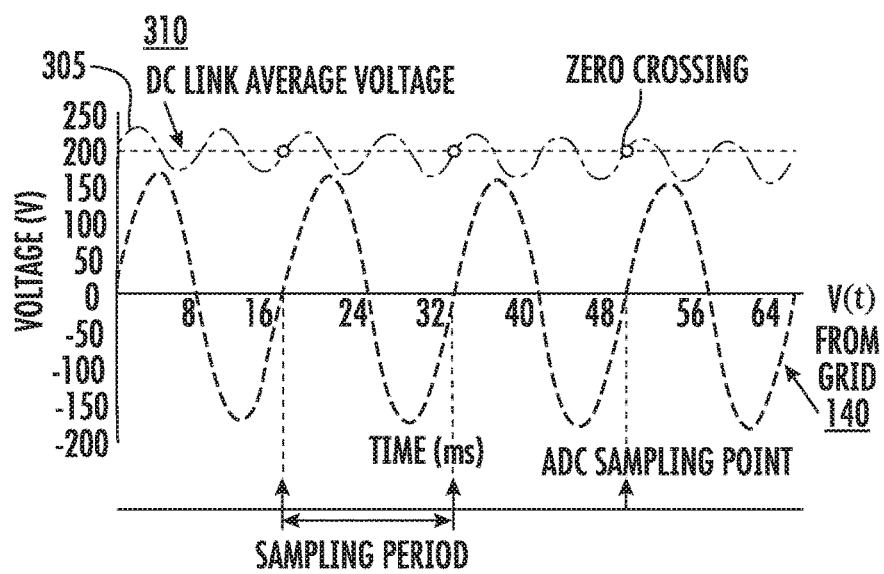
FIG. 3 shows PLL-synchronized DC link voltage sampling times correspond to the times of DC link average voltage in a single-phase system.

FIG. 3 shows example PLL-synchronized DC link voltage sampling times that are where the AC component of the ripple voltage 305 for $V_{DClink}(t)$ intersects its DC link average voltage value 310. It can be seen that at these times V(t) from the grid 140 is at essentially zero volts. Since the synchronous controller 260 directly senses the DC link average voltage when the ADC 161 senses $V_{DClink}(t)$, this method does not add unwanted harmonics to the microinverter's 150 output current waveform. In order to avoid unwanted harmonics in the output current waveform, the microinverter current can be adjusted only once every line cycle. The microinverter current is adjusted once every line cycle at each zero crossing of the ripple voltage 305 on the DC link average voltage, but there is generally a small delay between the sampling time and this zero crossing.

A feature of disclosed embodiments is to enable the use of longer life, reliable and lower value film capacitors for the DC link capacitor 154. The disclosed synchronous controller 260 uses a simple and accurate synchronous sampling method to sense the DC link average voltage without the addition of analog or digital filters. Digital and analog filters increase circuit complexity and/or cost while exhibiting inferior performance to that provided by this Disclosure. An advantage of a disclosed synchronous controller 260 is that it provides excellent performance without the need for any additional circuit components.

This Disclosure also makes it possible to select a lower minimum acceptable value for a film capacitor for the DC link capacitor 154 which reduces the design cost and improves reliability and power density by avoiding the adverse impacts of the high DC link peak-to-peak voltage ripple. Disclosed embodiments are applicable to any microinverter topologies with a DC link such as full-bridge and half-bridge, as well as single and three-phase inverters.

Figure 4:
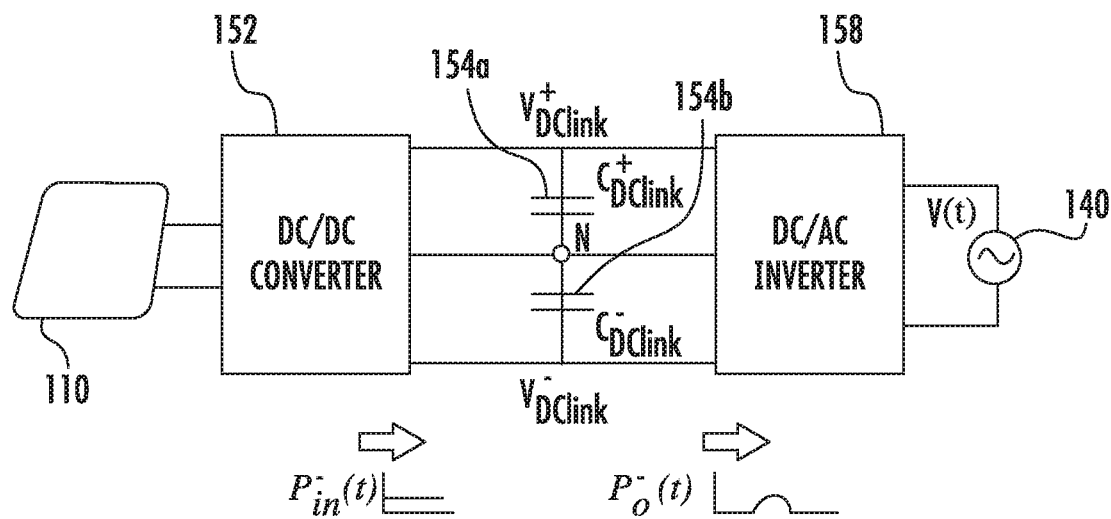
FIG. 4 shows a single-phase half-bridge microinverter with a split DC link.

Described below are two examples of single-phase and three-phase microinverters with a split DC link (2 DC link capacitors in series), with a relatively large DC link voltage ripple. FIG. 4 shows a single-phase half-bridge microinverter with a split DC link shown as DC link capacitors 154a and 154b. As disclosed above, the DC link capacitor(s) located between the two stages is charged by DC power from the PV panel 110 and discharged by the pulsating power injected into the grid 140. The pulsating power causes a voltage ripple on the DC link capacitors.

Figure 5:
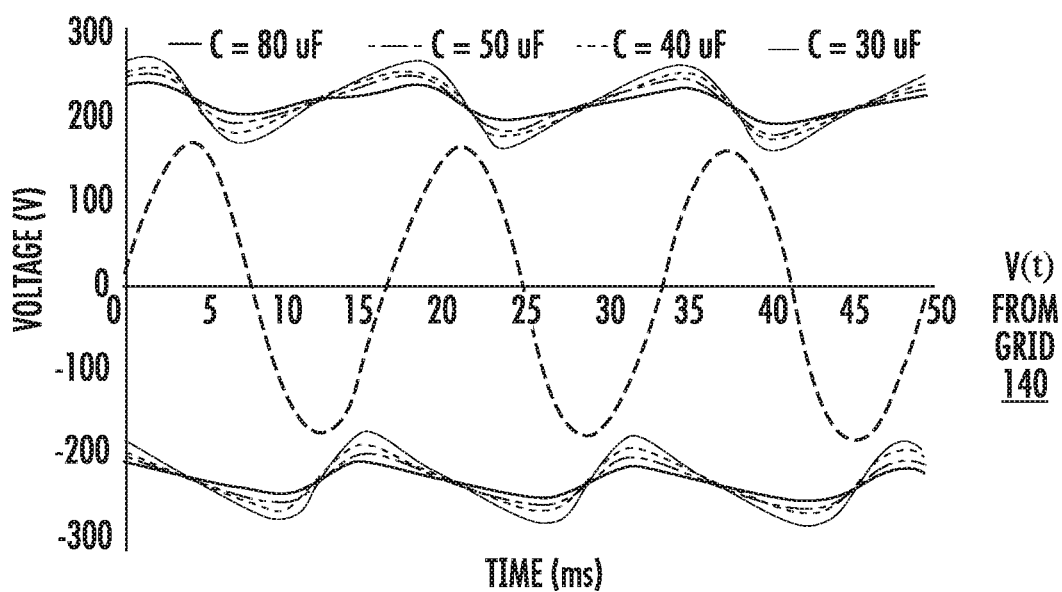
FIG. 5 shows a split DC link voltage ripple with different storage capacitance in a half-bridge single-phase.

FIG. 5 shows the split DC link voltage and grid voltage with different values of storage capacitance for DC link capacitors 154a and 154b for a disclosed microinverter prototype configured as a half-bridge single-phase system when the DC link average voltage is set at +220 V and −220 V with a grid voltage (V(t)) of 120 Vrms. Referring to FIG. 5, as the storage capacitance for DC link capacitors 154a and 154b decreases, the DC link voltage ripple increases. Using the conventional DC link control methods described in the background, at least an 80 µF of storage capacitor needs to be used so that the controller has an acceptable performance. However, disclosed embodiments make it possible to select a DC link capacitor comprising a 30 µF capacitor for the DC link by avoiding the adverse impacts of the high DC link peak-to-peak voltage ripple (about 90 V peak-to-peak).

Figure 6:
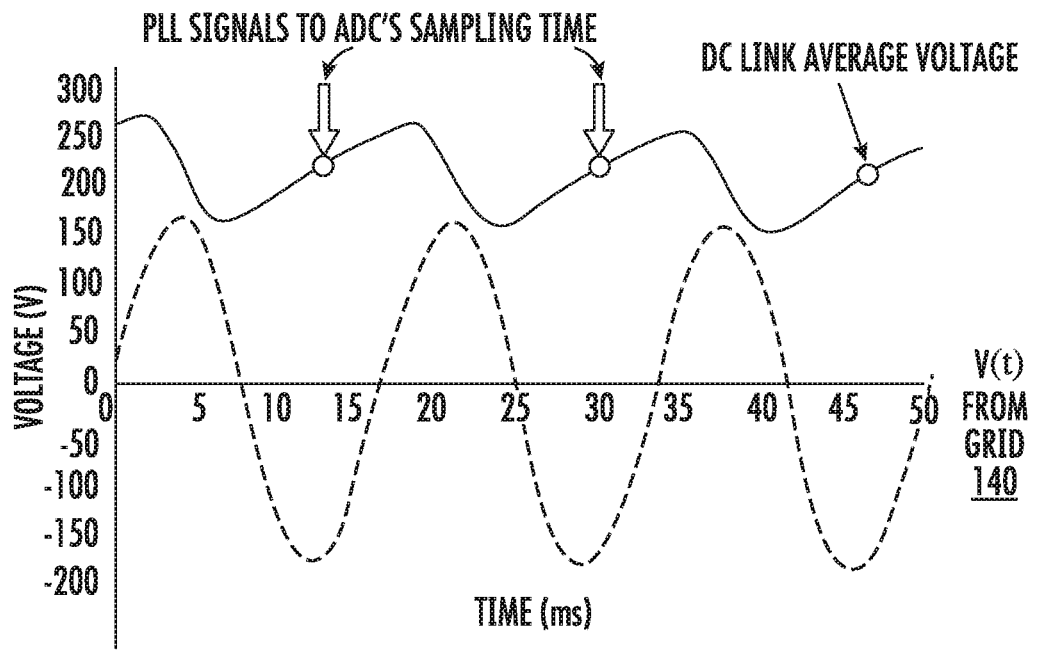
FIG. 6 shows a disclosed PLL-synchronized DC link voltage sampling time in the half-bridge single-phase system.
Figure 7:
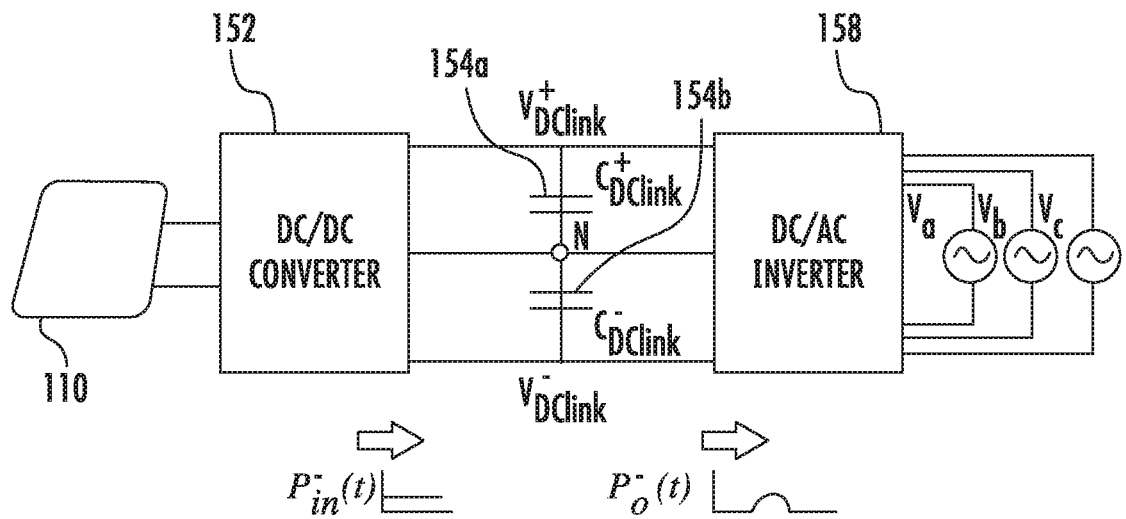
FIG. 7 shows a three-phase half-bridge microinverter with a split DC link.

FIG. 6 shows an example PLL-synchronized DC link voltage with disclosed sampling times from the PLL's output signal to the clock input of the ADC for the half-bridge single-phase system. There can be a very small offset or no measurable offset between the ADC's sampling times and the zero crossing of the grid voltage in FIG. 3, but in FIGS. 6 and 9, this offset is noticeable. The ADC's 161 trigger signal generated by the PLL 164 is not necessarily at zero crossing. Depending on the microinverter configuration and operation, there might be a positive or negative offset. FIG. 7 shows an example three-phase half-bridge microinverter with a split DC link with DC link capacitors 154a and 154b showing the DC/AC inverter outputting phases a, b and c shown as Va, Vb, and Vc.

Advantages or benefits of disclosed embodiments include reducing microinverter circuit complexity, improving performance, increasing reliability, and reducing cost. Typical controllers for microinverters sample the DC link voltage at several kilohertz. Consequently, if the DC link voltage contains harmonic distortion, this distortion is included in the sampling causing the error signal to have a harmonic content. In order to mitigate this effect, analog and digital filters are generally used in the DC link voltage control system. In the case of high peak-to-peak voltage ripple on the DC link, an analog filter would require a very high attenuation which results in lower bandwidth as well as adding cost to the design. Digital filters provide some improvement but increase complexity, and are unable to eliminate all of the harmonic content. An advantage of disclosed synchronous controllers is that they use a simple and accurate synchronous sampling method to sense the DC link average voltage which provides excellent performance without the need for any analog or digital filters.

Regarding disclosed microinverters having synchronous sampling DC link voltage control for PV applications, microinverters are gaining popularity over their string inverter counterparts in PV-based power generation systems due to maximized energy harvesting, high system reliability, modularity, and simple installation. Disclosed microinverters can be used in commercial buildings, residential rooftops, and electric poles.

EXAMPLES

Disclosed embodiments of the invention are further illustrated by the following specific Examples, which should not be construed as limiting the scope or content of this Disclosure in any way.

Figure 8:
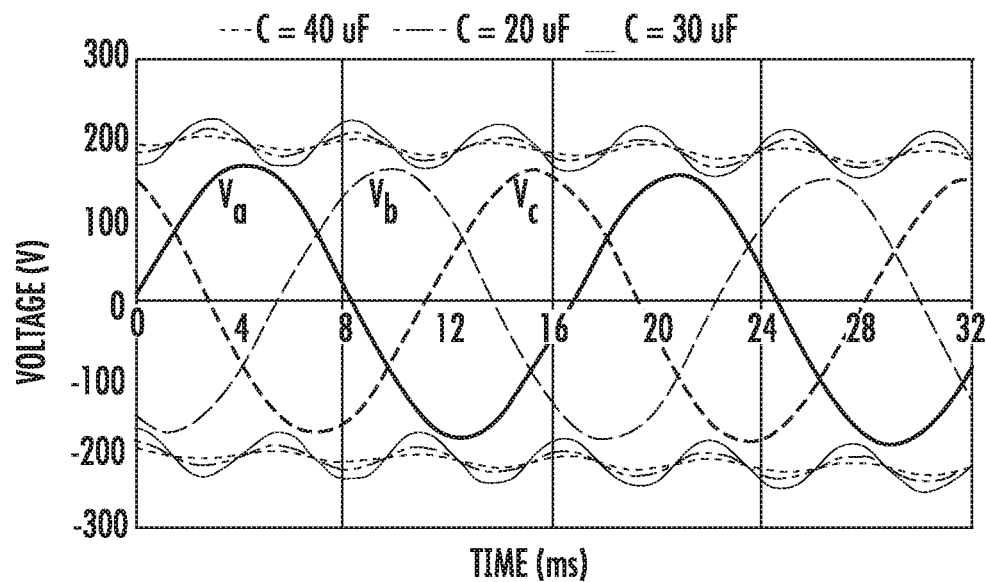
FIG. 8 shows a split DC link voltage ripple with different storage capacitance in a three-phase half-bridge system.

FIG. 8 shows the split DC link voltage and grid voltage with different values of storage capacitance for the DC link capacitor 154 for a microinverter prototype 3-phase half-bridge inverter when the DC link average voltage is set at +200 V and −200 V with a grid voltage of 120 Vrms. Referring to FIG. 8, as the storage capacitance decreases, the DC link voltage ripple increases. With a 200 V DC link average voltage and a 40 µF storage capacitor typically used in a conventional design, 2 V of voltage ripple (peak-to-peak) is observed. Disclosed embodiments make it possible to select a 8 µF film capacitor for the DC link capacitor 154 by avoiding the adverse impacts of the high DC link peak-to-peak voltage ripple.

Figure 9:
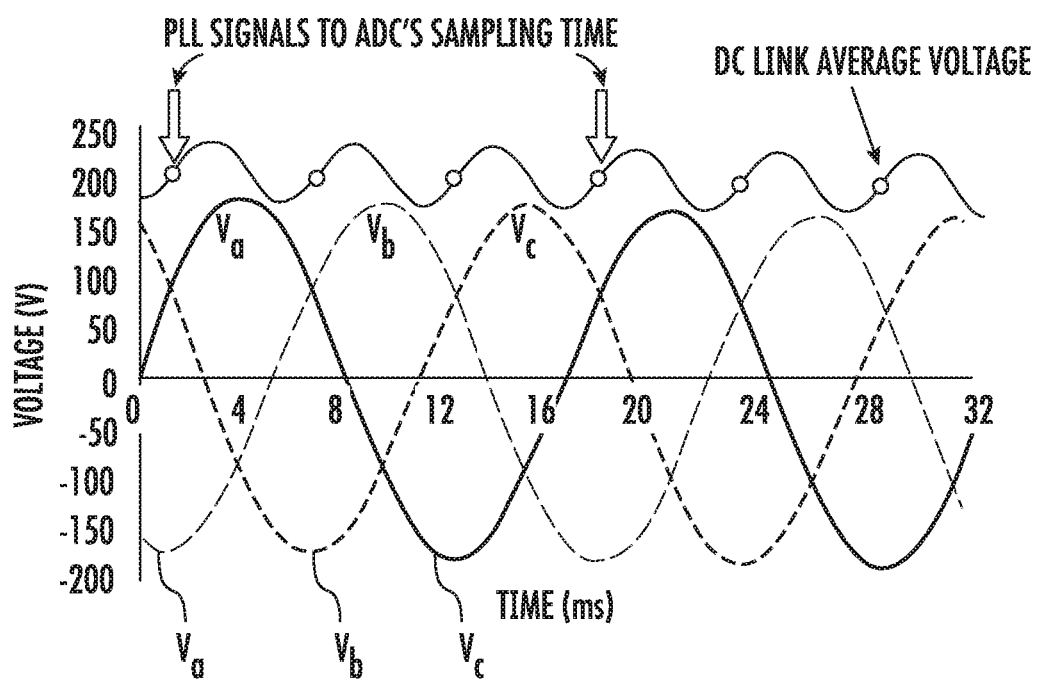
FIG. 9 shows disclosed PLL-synchronized DC link voltage sampling time in a three-phase half-bridge system.

FIG. 9 shows the PLL-synchronized DC link voltage sampling time in a three-phase half-bridge system. The respective phases are shown as Va, Vb, and Vc. Using this disclosed sampling technique, the DC link controller is able to accurately measure the DC link average voltage value and use it to regulate the inverter output current with a minimum THD.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. For example, other devices having a DC link capacitor for energy storage, such as motor controllers and other power electronic circuits such as power supplies having power factor correction (PFC) can also benefit. Moreover, alternative arrangements can be used to utilize the grid voltage signal to control the clock input of the ADC 161 so that its sampling is when the DC link average voltage the AC component of the ripple voltage intersects the DC link average voltage value, such as using a comparator instead of a PLL. Thus, the breadth and scope of this Disclosure should not be limited by any of the above-described embodiments. Rather, the scope of this Disclosure should be defined in accordance with the following claims and their equivalents.

Unless otherwise defined, all terms (including technical and scientific terms) used herein have the same meaning as commonly understood by one of ordinary skill in the art to which this Disclosure belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The invention claimed is:

1. A two-stage microinverter for coupling a photovoltaic (PV) panel to a power grid, comprising:
a DC/DC converter stage having an input for coupling to the PV panel and a DC/AC inverter stage that has an output for coupling to the power grid with at least one DC link capacitor in between the DC/DC converter stage and the DC/AC inverter stage, and
a synchronous controller including a loop compensator coupled to a mixer between an analog-to-digital converter (ADC) and a phase-locked loop (PLL) for coupling to an output voltage from the power grid, wherein the ADC is coupled to receive a DC link voltage from the DC link capacitor,
wherein an output of the PLL is coupled to an internal clock pin of the ADC for controlling a timing of sampling by the ADC of the DC link voltage so that the ADC samples the DC link voltage at an instance when an alternating current (AC) component of a ripple voltage on the DC link voltage intersects an average value of the DC link voltage.

2. The two-stage microinverter of claim 1, wherein the output of the PLL is directly connected to the internal clock pin for controlling the timing of the sampling.

3. The two-stage microinverter of claim 1, wherein the at least one DC link capacitor has a capacitance that is less than or equal to (≤) 30 µF.

4. The two-stage microinverter of claim 3, wherein the capacitance is ≤10 µF.

5. The two-stage microinverter of claim 1, wherein the two-stage microinverter consists of the at least one DC link capacitor and the DC/AC inverter stage in a full-bridge configuration.

6. The two-stage microinverter of claim 5, wherein the DC/AC inverter stage is configured as a single-phase full-bridge system.

7. The two-stage microinverter of claim 1, wherein the at least one DC link capacitor comprise a split arrangement including a first and a second DC link capacitor and the DC/AC inverter stage is in a half-bridge configuration.

8. The two-stage microinverter of claim 7, wherein the DC/AC inverter stage is configured as a three-phase half-bridge system.

9. A method of operating a two-stage microinverter coupled between a photovoltaic (PV) panel and a power grid, comprising:
providing the two-stage microinverter including a DC/DC converter stage having an input for coupling to the PV panel and a DC/AC inverter stage having an output for coupling to the power grid with at least one DC link capacitor in between the DC/DC converter stage and the DC/AC inverter stage, and a synchronous controller including a loop compensator between an analog to digital converter (ADC) and a phase-locked loop (PLL) for coupling to an output voltage from the power grid, wherein the ADC is coupled to receive a DC link voltage from the DC link capacitor, coupling an output of the PLL to an internal clock pin of the ADC to control a timing of sampling by the ADC of the DC link voltage so that the ADC samples the DC link voltage at an instance when an alternating current (AC) component of a ripple voltage on the DC link voltage intersects an average value of the DC link voltage.

10. The method of claim 9, wherein the output of the PLL is directly connected to the internal clock pin for controlling the timing of the sampling.

11. The method of claim 9, wherein the at least one DC link capacitor has a capacitance that is less than or equal to (≤) 30 µF.

12. The method of claim 11, wherein the capacitance is ≤10 µF.

13. The method of claim 9, wherein the two-stage micro-inverter consists of the at least one DC link capacitor and the DC/AC inverter stage is a full-bridge configuration.

14. The method of claim 13, wherein the DC/AC inverter stage is configured as a single-phase full-bridge system.

15. The method of claim 9, wherein the at least one DC link capacitor comprise a split arrangement including a first and a second DC link capacitor and the DC/AC inverter stage is in a half-bridge configuration.

16. The method of claim 15, wherein the DC/AC inverter stage is configured as a three-phase half-bridge system.

\* \* \* \* \*